(12) United States Patent
Du et al.

(10) Patent No.: US 6,307,694 B1
(45) Date of Patent: Oct. 23, 2001

(54) ERROR SIGNAL BIASING FOR AN ADAPTIVE FILTER IN A DISK DRIVE READ CHANNEL

(75) Inventors: Li Du, Denver; Mark Stephen Spurbeck, Superior; Richard Travis Behrens, Lafayette, all of CO (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/256,695

(22) Filed: Feb. 24, 1999

(51) Int. Cl.$^7$ ........................................................ G11B 5/09
(52) U.S. Cl. ................................ 360/46; 360/65; 360/75; 360/66
(58) Field of Search ................................ 360/46, 65, 71, 360/75, 66, 78.09; 375/229, 230, 232; 318/560; 369/44.29, 44.35

(56) References Cited

U.S. PATENT DOCUMENTS

| | | |
|---|---|---|
| 4,866,647 | 9/1989 | Farrow . |
| 5,257,252 | * 10/1993 | Barnes et al. ...................... 360/77.06 |
| 5,418,660 | * 5/1995 | Sato et al. ............................... 360/65 |
| 5,563,819 | 10/1996 | Nelson . |
| 5,684,651 | * 11/1997 | Yaegashi et al. ...................... 360/46 |
| 5,696,639 | 12/1997 | Spurbeck et al. . |
| 5,717,619 | 2/1998 | Spurbeck et al. . |
| 5,726,818 | 3/1998 | Reed et al. . |
| 5,760,984 | 6/1998 | Spurbeck et al. . |
| 5,768,228 | * 6/1998 | Bates et al. ........................ 369/44.29 |
| 5,903,857 | 5/1999 | Behrens et al. . |
| 5,909,332 | 6/1999 | Spurbeck et al. . |
| 5,917,668 | 6/1999 | Behrens et al. . |
| 5,963,390 | * 10/1999 | Tabuchi .............................. 360/73.01 |
| 6,115,198 | * 9/2000 | Reed et al. .............................. 360/46 |
| 6,118,812 | * 9/2000 | Dagdeviren .......................... 375/229 |

FOREIGN PATENT DOCUMENTS 0 805 447 A2 5/1997 (EP) .

OTHER PUBLICATIONS

Feyh, G., "Subsampled Digital Retiming for Optical Disk," Cirrus Logic, Inc., Cirrus Logic, Inc. (Broomfield, CO) (Jul., 1999).

Proakis, John G., "Digital Communications," Department of Electrical and Computer Engineering, Northeastern University, 3rd ed., McGraw–Hill, Inc., p. 637–638 (Dec., 1995).

* cited by examiner

*Primary Examiner*—Alan Faber
(74) *Attorney, Agent, or Firm*—Dan A. Shifrin (57) ABSTRACT

The invention includes disk drive circuitry, systems, and methods. The disk drive system comprises control circuitry and a disk device. The disk device stores data and transfers an analog signal representing the data. The control circuitry receives the analog signal, converts the analog signal into a digital signal, transfers the digital signal, and biases an error signal. The control circuitry includes an analog-to-digital converter, adaptive filter, a decoder, and error signal circuitry. The analog-to-digital converter receives and samples the analog signal to generate a sampled signal. The adaptive filter shapes the sampled signal based on coefficients to produce a shaped signal. The decoder decodes the shaped signal to generate the digital signal. The error signal circuitry generates the biased error signal to adjust the coefficients in the adaptive filter. The error signal circuitry may generate the error signal by determining a difference between the shaped signal from the adaptive filter and an ideal signal. The error signal circuitry may bias the error signal by biasing the ideal signal. The error signal circuitry may bias the ideal signal by adjusting a slicer output by a step value.

46 Claims, 11 Drawing Sheets

ERROR SIGNAL BIASING FOR AN ADAPTIVE FILTER IN A DISK DRIVE READ CHANNEL

BACKGROUND OF THE INVENTION

1. Field of the Invention

The invention is related to the field of disk drive systems, and in particular, to disk drive systems and circuitry that bias the error signal for the adaptive filter in the read channel.

2. Statement of the Problem

Figure 1:
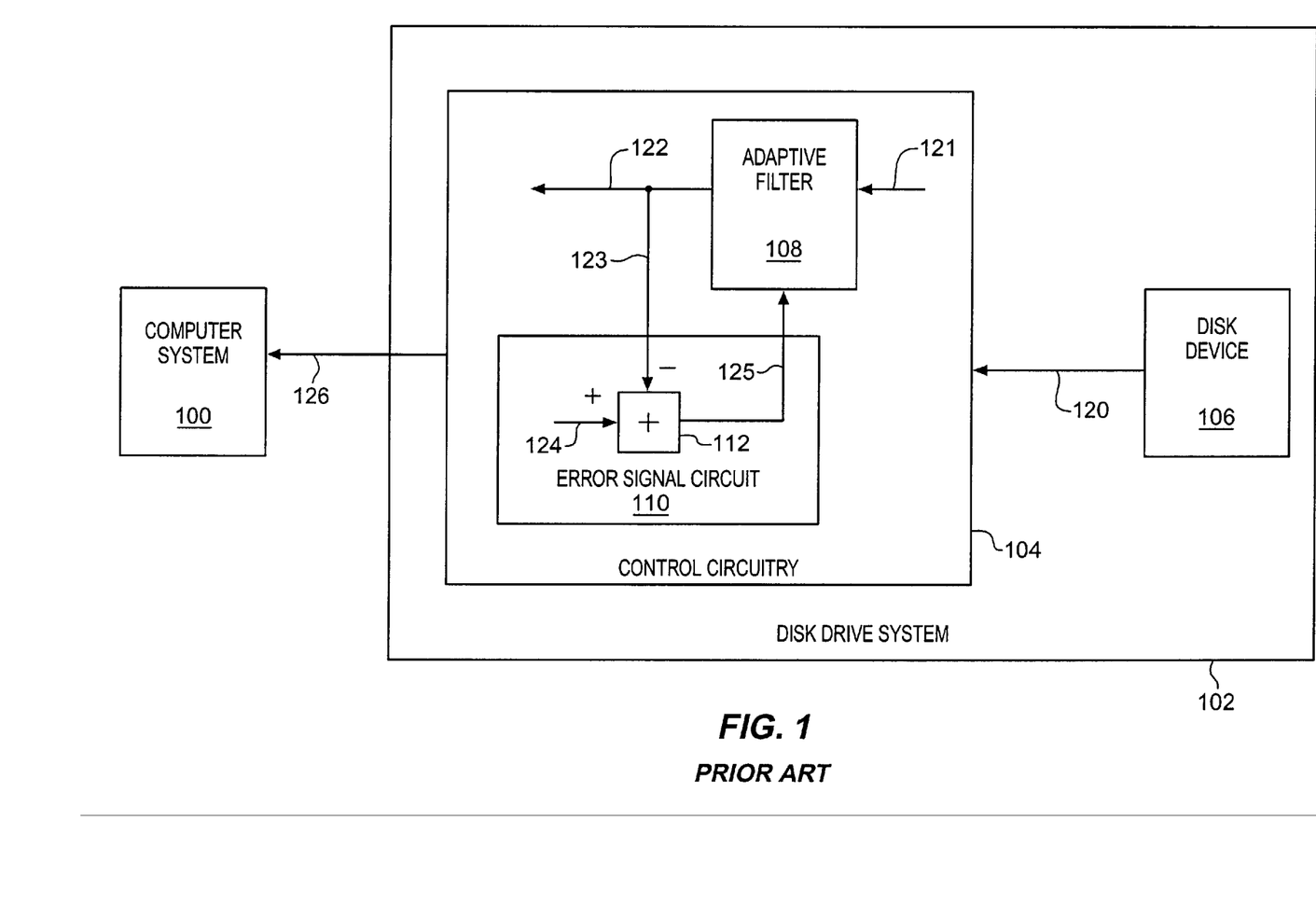
FIG. 1 is a block diagram that depicts a conventional disk drive system.

FIG. 1 depicts a conventional system that includes a host computer system 100 and a disk drive system 102. The disk drive system 102 includes control circuitry 104 and disk device 106. The disk device 106 stores data for the computer system 100. To transfer this data from the disk device 106 to the computer system 100, the disk device 106 transfers a signal 120 to the control circuitry 104. The signal 120 is an analog representation of the data. The control circuitry 104 converts the signal 120 into a signal 126 for the computer system 100. The signal 126 is a digital representation of the data and is suitable for processing by the computer system 100. Thus, the control circuitry 104 converts an analog representation of the data into a digital representation of the data.

Those skilled in the art will appreciate that numerous conventional components of the disk drive system 102 are not depicted on FIG. 1 for the purpose of clarity. For example, the disk device 106 typically includes disks on which data is written, heads to write/read the data to/from the disks, and motors that position heads and rotate the disks. The control circuitry 104 typically includes a controller, servo circuitry, and a read channel. The controller manages data transfers. The servo circuitry controls the motors to position the heads and rotate the disks. The read channel converts the analog signals from the disks into usable digital data. The read channel includes an adaptive filter 108 and an error signal circuit 110 that are shown on FIG. 1.

The adaptive filter 108 is a digital Finite Impulse Response (FIR) filter that receives a signal 121. The signal 121 is a sampled version of the signal 120. The adaptive filter 108 processes the samples in the signal 121 to generate the signal 122. In particular, the adaptive filter 108 digitally alters pulses in the signal 121 into a shape that is more suitable for processing by subsequent decoding circuitry (not shown). The adaptive filter 108 continually improves its performance by adjusting coefficients in response to an error signal 125. It should be appreciated that improving the performance of the adaptive filter 108 will reduce data errors in the signal 126.

The error signal circuit 110 receives a signal 123 that is a copy of the of the signal 122. An adder 112 in the error signal circuit 110 effectively subtracts the signal 123 from an ideal signal 124 to generate the error signal 125. The ideal signal 124 can be generated in numerous ways, such as using a slicer on the signal 123 or by using a digital copy of the data stored on the disk device 106. As mentioned above, the adaptive filter 108 uses the error signal 125 to modify its coefficients and improve bit error rate performance.

Unfortunately, the bit error rate performance of the conventional disk drive system 102 suffers because the adaptive filter coefficients do not converge to a solution for optimum bit error rate performance. The convergence problem is derived from the fact that the adaptive filter 108 has Least Mean Square (LMS) circuitry that adjusts the coefficients using a Mean Squared Error (MSE) driven process. Although MSE is a convenient metric that correlates with bit error rate, the correlation is not perfect. Thus, the convergence problem in the conventional disk drive 102 permits additional data errors to remain that prevent or slow the operation of the computer system 100. The additional data errors also require more expensive disk drive components to compensate for the errors.

Given the enormous growth in the demand for higher capacity computer data storage, there is an acute need to continually improve the performance of disk drive systems. In particular, solutions are needed to reduce the problem of data errors in disk drive systems. These solutions will allow less expensive components to be used while maintaining or improving current error rates. The cost savings can be passed on to the consumer in the form of less expensive computer data storage.

SUMMARY OF THE SOLUTION

The invention solves the above problem by biasing an error signal that adjusts the coefficients in the adaptive filter. The error signal biasing may be adjusted to minimize the read channel bit error rate. Thus, the invention allows the read channel adaptive filter to converge to a solution closer to the minimum bit error rate than an MSE driven process. Consequently, the problem of data errors in disk drive systems is reduced, so less expensive disk drive components may be used while maintaining or improving current bit error rates.

The invention includes disk drive circuitry, systems, and methods. The disk drive system comprises control circuitry and a disk device. The disk device stores data and transfers an analog signal representing the data. The control circuitry receives the analog signal, converts the analog signal into a digital signal, transfers the digital signal, and biases an error signal.

The control circuitry includes an analog-to-digital converter, adaptive filter, decoder, and error signal circuitry. The analog-to-digital converter receives and samples the analog signal to generate a sampled signal. The adaptive filter shapes the sampled signal based on coefficients to produce a shaped signal. The decoder decodes the shaped signal to generate the digital signal. The error signal circuitry generates the biased error signal to adjust the coefficients in the adaptive filter.

The error signal circuitry may generate the error signal by determining a difference between the shaped signal from the adaptive filter and an ideal signal. The error signal circuitry may bias the error signal by biasing the ideal signal. The error signal circuitry may bias the ideal signal by adjusting a slicer output by a step value.

DETAILED DESCRIPTION OF THE INVENTION

Figure 2:
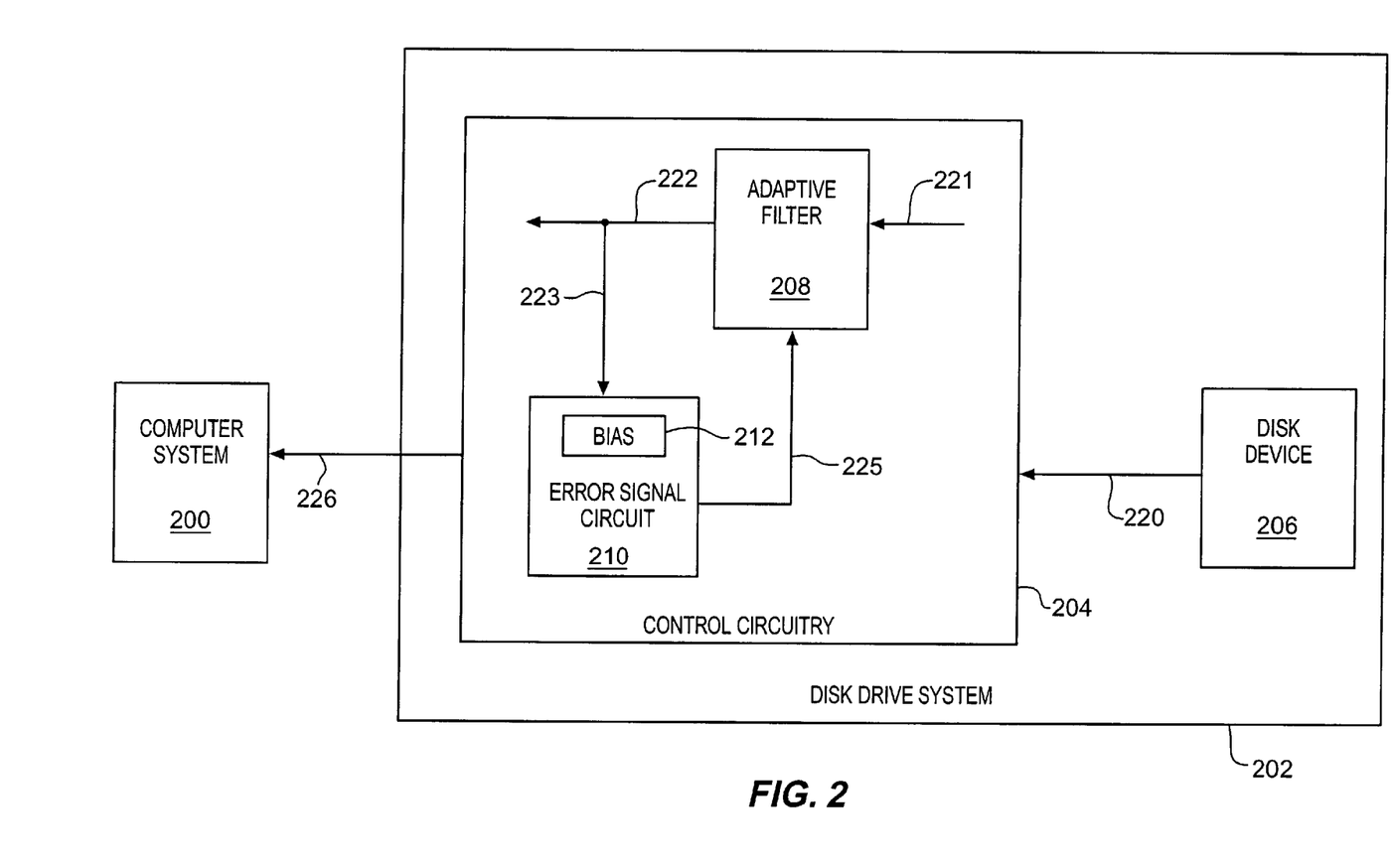
FIG. 2 is a block diagram that depicts a disk drive system in an example of the invention.

Disk Drive System—FIG. 2

FIG. 2 depicts a disk drive system 202 that is configured and operates in accord with the invention. The disk drive system 202 stores data for the computer system 200 and includes control circuitry 204 and a disk device 206. The disk device 206 could be any device that stores the data and transfers a signal 220 to the control circuitry 204. The signal 220 is an analog representation of data for the computer system 200. The control circuitry 204 could be any circuitry that converts the signal 220 into the signal 226 and transfers the signal 226 to the computer system 200. The signal 226 is a digital representation of the data for the computer system 200. The control circuitry 204 is typically comprised of an integrated circuit or a set of integrated circuits. The integrated circuitry typically includes memory that stores instructions and processors that retrieve and execute the instructions to control system operations.

The control circuitry 204 includes an adaptive filter 208 and an error signal circuit 210. The adaptive filter 208 receives a signal 221 that is a sampled version of the signal 220. The adaptive filter 208 processes the samples in the signal 221 to generate the signal 222. In particular, the adaptive filter 208 alters pulses in the signal 221 into a shape that is more suitable for processing by subsequent decoding circuitry (not shown). The adaptive filter 208 continually improves its performance by adjusting programmable coefficients in response to a biased error signal 225.

The error signal circuit 210 receives a signal 223 that is a copy of the signal 222. The error signal circuit 210 uses bias circuitry 212 to process the signal 223 to generate the biased error signal 225. The bias circuitry 212 could be any circuitry that provides biasing within the error signal circuit 210. The adaptive filter 208 uses the biased error signal 225 to modify its coefficients. The adaptive filter 208 coefficients converge to a solution closer to optimal bit error rate performance than convergence without biasing. Thus, the bias circuitry 212 improves the performance of the disk drive system 200 by reducing the bit error rate of the signal 226.

Magnetic Disk Drive System—FIGS. 3–7

FIGS. 3–7 depict a specific example of a magnetic disk drive system in accord with the present invention. Those skilled in the art will appreciate numerous variations from this example that do not depart from the scope of the invention. Those skilled in the art will also appreciate that various features described below could be combined with the above-described embodiment to form multiple variations of the invention.

Figure 3:
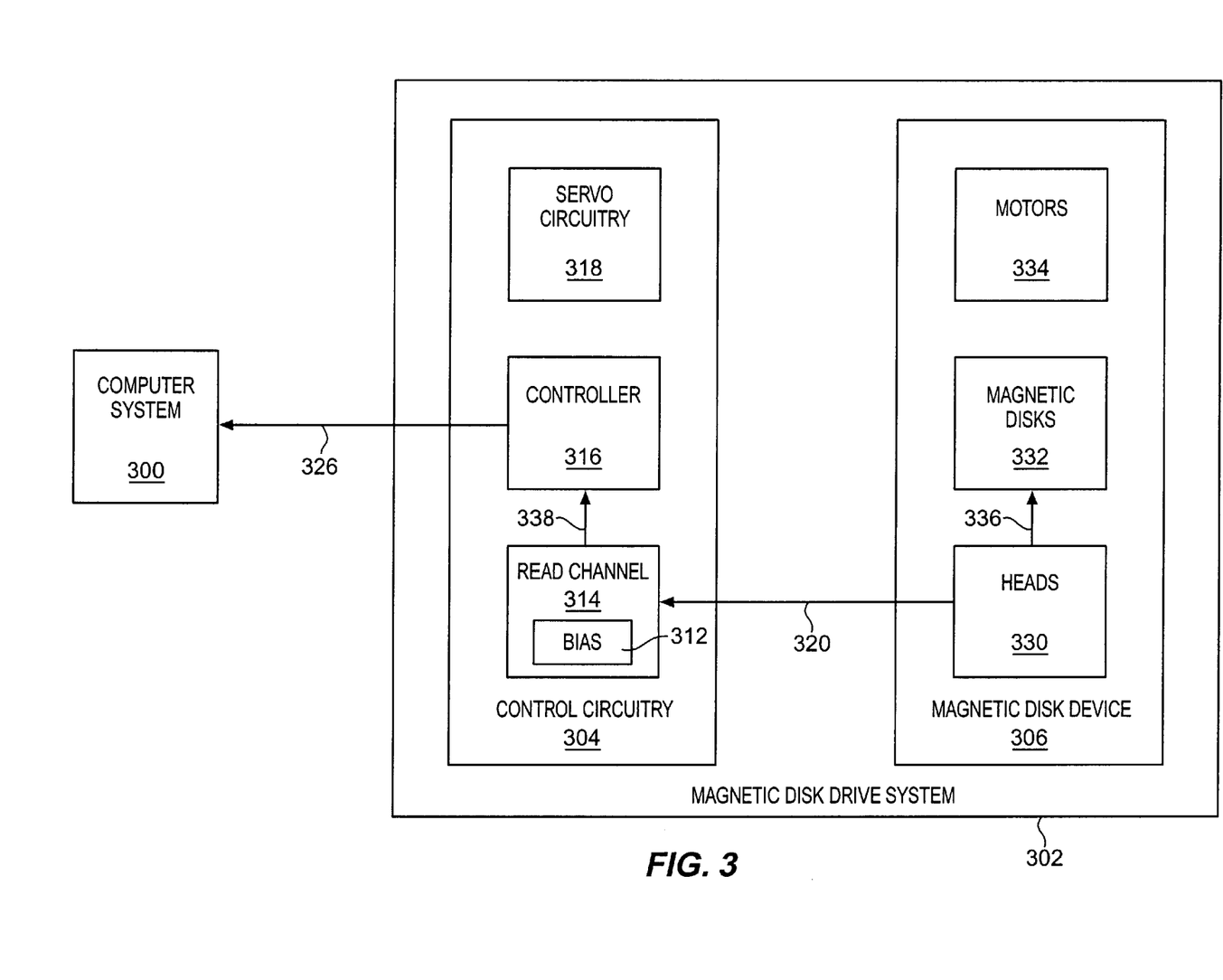
FIG. 3 is a block diagram that depicts a magnetic disk drive system in an example of the invention.

FIG. 3 depicts a magnetic disk drive system 302 that is configured and operates in accord with the invention. The magnetic disk drive system 302 includes control circuitry 304 and a magnetic disk device 306. The control circuitry 304 includes read channel 314, controller 316, and servo circuitry 318. The read channel 314 includes bias circuitry 312. The magnetic disk device 306 includes heads 330, magnetic disks 332, and motors 334. Aside from the bias circuitry 312, the components on FIG. 3 could be conventional.

The magnetic disk drive system 302 is operational to receive data from the computer system 300 and write the data to the magnetic disks 332. The magnetic disk drive system 302 is operational to subsequently read the data from the magnetic disks 332 and provide the data to the computer system 300.

In a typical read operation, the controller 316 receives a request from the computer system 300 to retrieve data previously stored on the magnetic disks 332. The controller 316 instructs the servo circuitry 318 to control the motors 334 to position one of the heads 330 over a sector that stores the requested data on one of the magnetic disks 332. Once positioned, the head reads a signal 336 from the sector on the magnetic disk. The head amplifies the signal 336 to generate the analog signal 320 and transfers the analog signal 320 to the read channel 314. The read channel 314 converts the analog signal 320 into a digital signal 338. During this conversion, the bias circuitry 312 in the read channel 314 biases an error signal provided to an adaptive filter (not shown). The read channel 314 transfers the digital signal 338 to the controller 316. The controller 316 buffers the digital data from the signal 338 and subsequently generates the signal 326 using the buffered data. The controller 316 transfers the digital signal 326 containing the requested data to the computer system 300.

Figure 4:
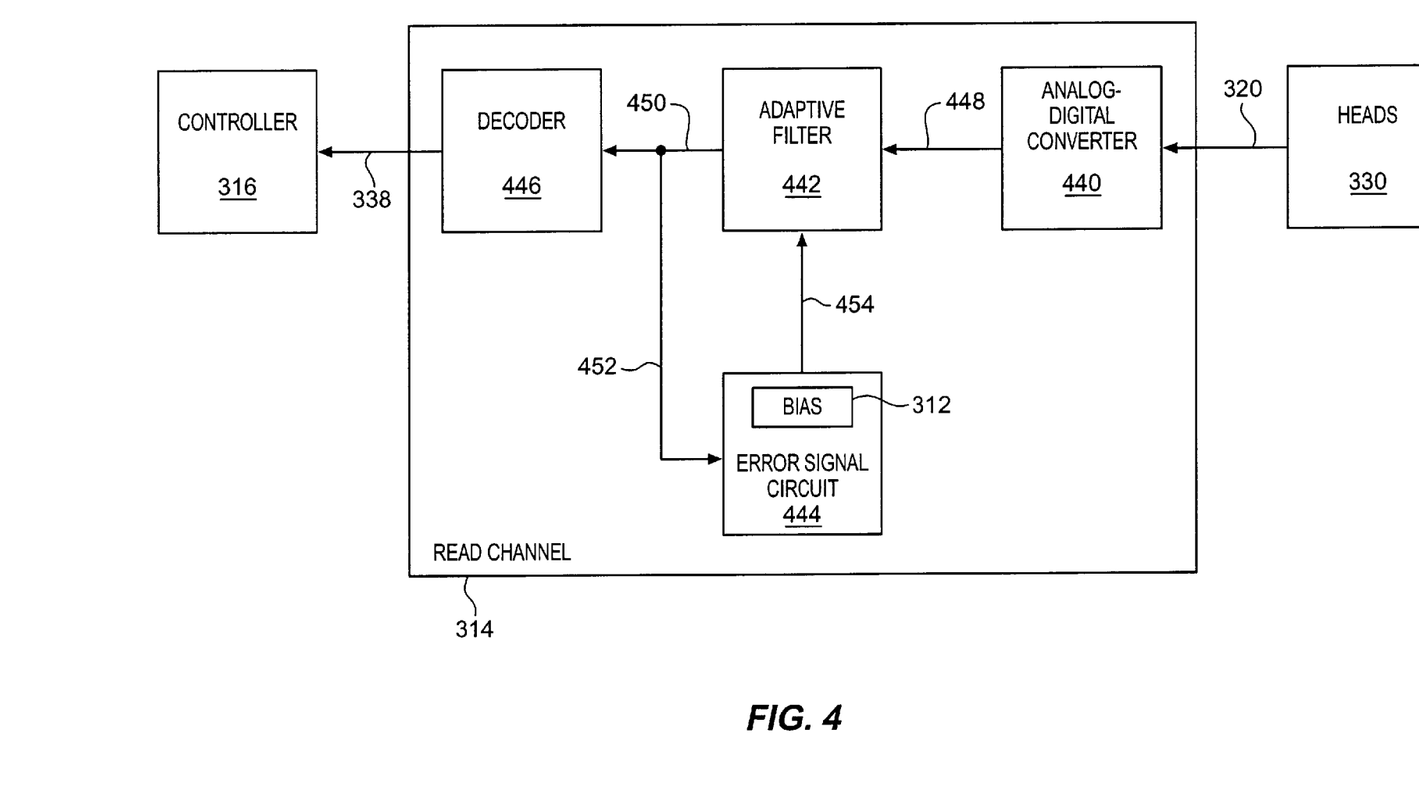
FIG. 4 is a block diagram that depicts read channel circuitry in an example of the invention.

FIG. 4 depicts the read channel 314. The read channel 314 includes a detector, such as an Analog-to-Digital Converter (ADC) 440, an adaptive filter 442, an error signal circuit 444, and a decoder 446. The error signal circuit 444 includes the bias circuitry 312. Aside from the bias circuitry 312, the components on FIG. 4 could be conventional.

In operation, the ADC 440 receives the analog signal 320 from the heads 330 and samples the analog signal 320 to generate a sampled signal 448. The adaptive filter 442 receives the sampled signal 448 and digitally shapes the pulses represented in the sampled signal 448 based on internally programmable coefficients. The goal of the filtering is to produce a signal 450 having pulses with a shape that is expected by the decoder 446. The adaptive filter 442 transfers the signal 450 to the decoder 446. The decoder 446 processes the signal 450 to detect binary data. The decoder 446 incorporates the binary data into the signal 338 and transfers the signal 338 to the controller 316.

The error signal circuit 444 receives a signal 452 which is a copy of the signal 450. The error signal circuit 444 processes the signal 452 using the bias circuitry 312 to generate a biased error signal 454. The error signal circuit 444 transfers the biased error signal 454 to the adaptive filter 442. The adaptive filter 442 modifies its internal coefficients based on the biased error signal 454.

Figure 5:
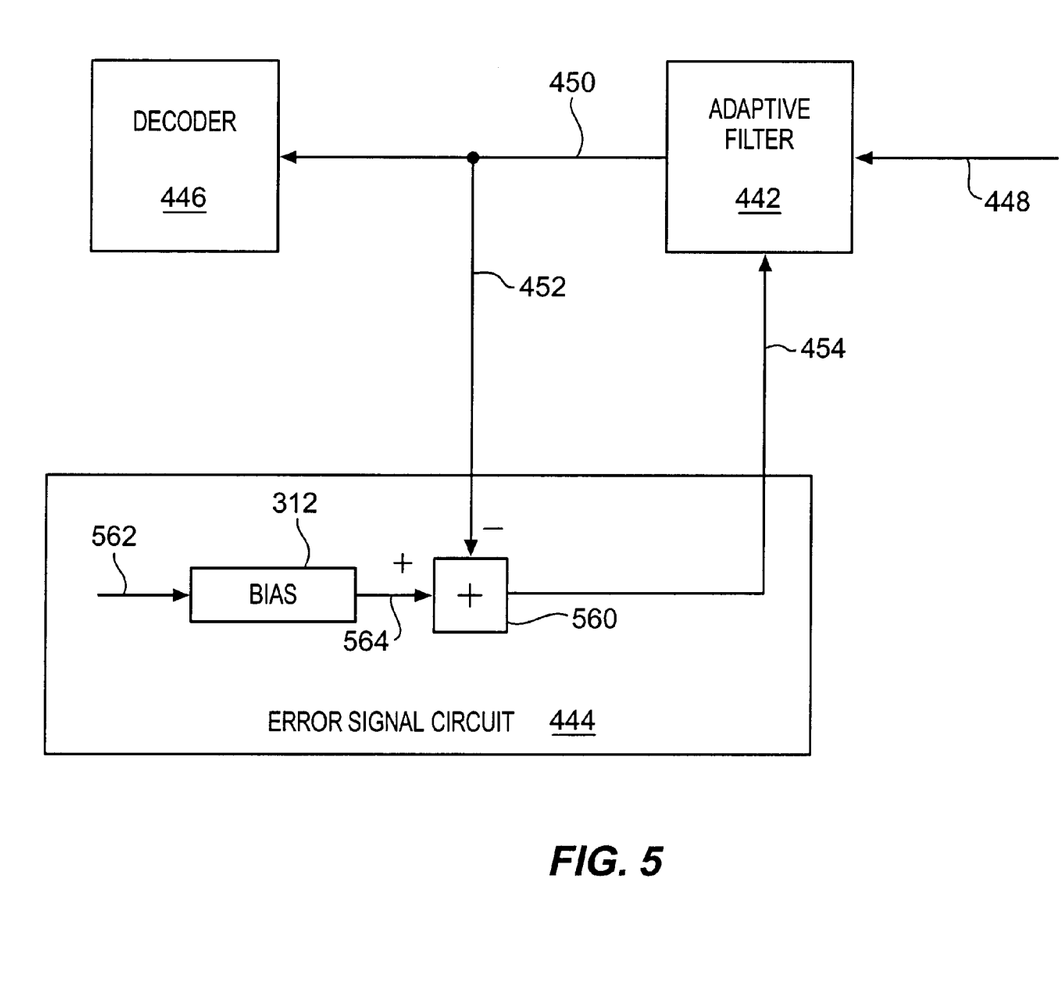
FIG. 5 is a block diagram that depicts biased error signal circuitry in an example of the invention.

FIG. 5 depicts the error signal circuit 444. The error signal circuit 444 includes bias circuitry 312 and adder 560. In operation, the bias circuitry 312 receives and biases an ideal signal 562 to generate a biased ideal signal 564. The ideal signal 562 can be generated in numerous ways, such as using a slicer on the signal 452 or by using a digital copy of the data stored on the disk device. The bias circuitry 312 transfers the biased ideal signal 564 to the adder 560. The adder 560 also receives the signal 452 and effectively subtracts the signal 452 from the biased ideal signal 564 to produce the biased error signal 454. Alternatively, the bias circuitry 312 could be located on the path of the signal 452. In this alternative, the adder 560 effectively subtracts a biased version of the signal 452 from the ideal signal 562 to produce the biased error signal 454.

The adaptive filter 442 is a digital FIR filter with internal coefficients. The adaptive filter 442 includes LMS circuitry that modifies the coefficients according to the equation:

$$c_{k+1}=c_k+(\mu)x_k e_k$$

where:
    $c_{k+1}$=the new coefficient
    $c_k$=the old coefficient
    $\mu$=the gain of adaptive filter 442
    $x_k$=the filter input signal 448
    $e_k$=the biased error signal 454=$i_k$(bias)-$y_k$
where:
    $i_k$=the ideal signal 562
    bias=the gain of the bias circuitry 312, and
    $y_k$=the filter output signal 452.

The bias circuitry 312 could be an adjustable gain. To initially configure the read channel, the gain of the bias circuitry 312 would be adjusted, and the bit error rate of the read channel would be measured. The adjustment that resulted in the minimum bit error rate would then be used to tune the adaptive filter 442 with optimal coefficients. After tuning, the optimal coefficients would then be fixed within the adaptive filter 442.

Figure 6:
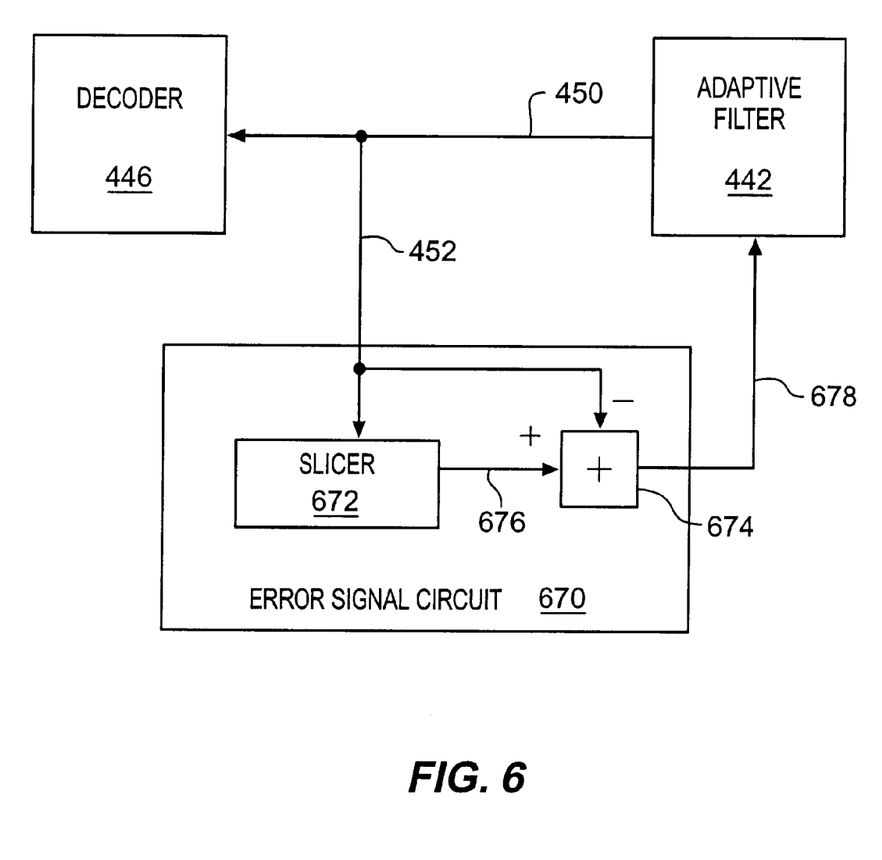
FIG. 6 is a block diagram that depicts an alternative biased error signal circuitry in an example of the invention.

FIG. 6 depicts an alternative version 670 of the error signal circuitry 444. The alternative error signal circuitry 670 includes a slicer 672 and an adder 674. In operation, the slicer 672 and the adder 674 receive the signal 452. The slicer 672 processes the signal 452 to produce the ideal signal 676 for the adder 674. The ideal signal 676 has three possible discreet values—positive, negative, and zero. The positive and negative values are adjusted by a step value when biasing is turned on. The adder 674 subtracts the signal 452 from the ideal signal 676 to produce the error signal 678. The adaptive filter 442 uses the error signal 678 to modify its coefficients and optimize performance. If desired, biasing could be added without the on/off option and associated on/off circuitry.

Figure 7:
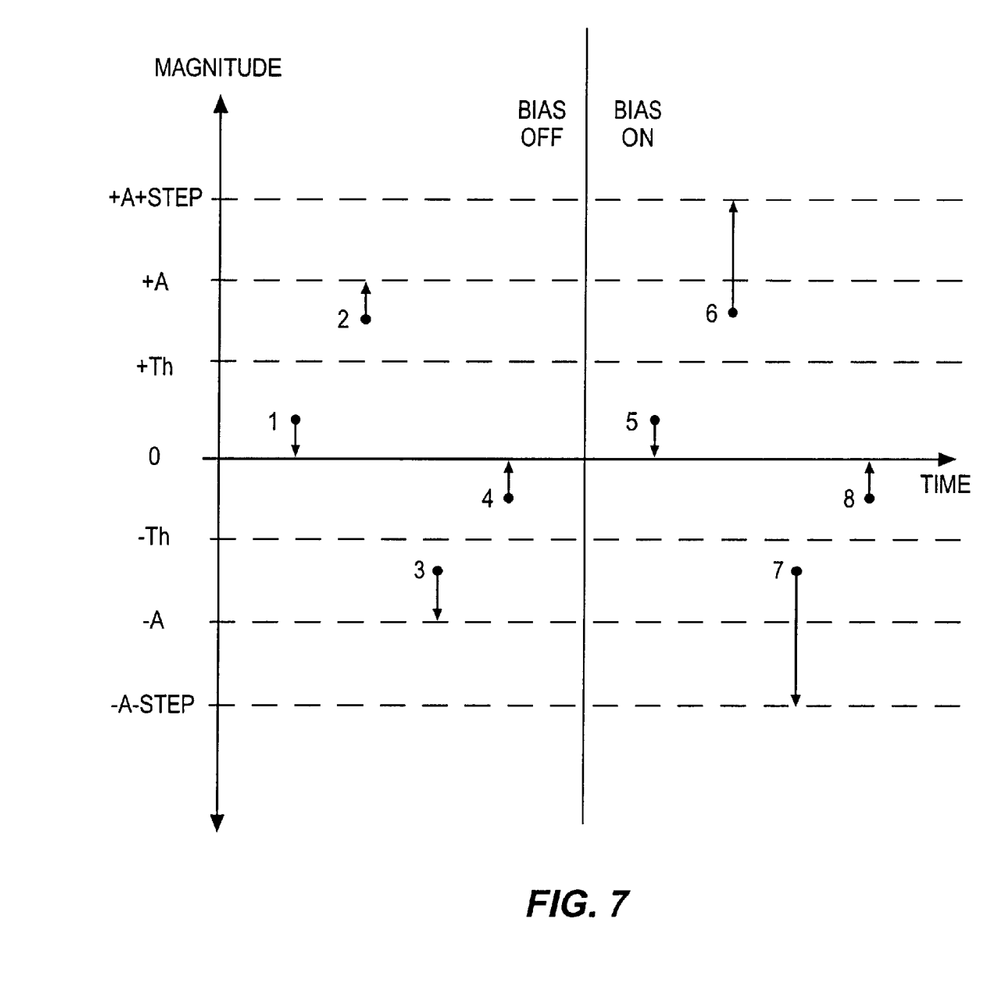
FIG. 7 is a graph that depicts biasing operations in an example of the invention.

FIG. 7 depicts the operation of the slicer 672. The vertical axis represents magnitude and the horizontal axis represents time. The vertical axis has values marked at various points: +A+step, +A, +Th, 0, -Th, -A, and -A-step. Those skilled in the art will appreciate values to use for Th and A. The step value would be stored in a register and could be 5% of the value A, but other positive or negative percentages could also be used. The numbered points 1–8 represent input values from the signal 452 received by the slicer 672. The arrows represent the output values for the ideal signal 676. For input values between +Th and -Th (points 1, 4, 5, 8), the slicer 672 outputs zero whether or not biasing is on or off. For an input value above +Th with biasing off (point 2), the slicer 672 outputs +A. For an input value below -Th with biasing off (point 3), the slicer 672 outputs -A. For an input value above +Th with biasing on (point 6), the slicer 672 outputs +A+step. For an input value below -Th with biasing on (point 7), the slicer 672 outputs -A-step. It should be appreciated that the slicer 672 enhances non-zero output values by the step value when biasing is turned on.

Figure 8:
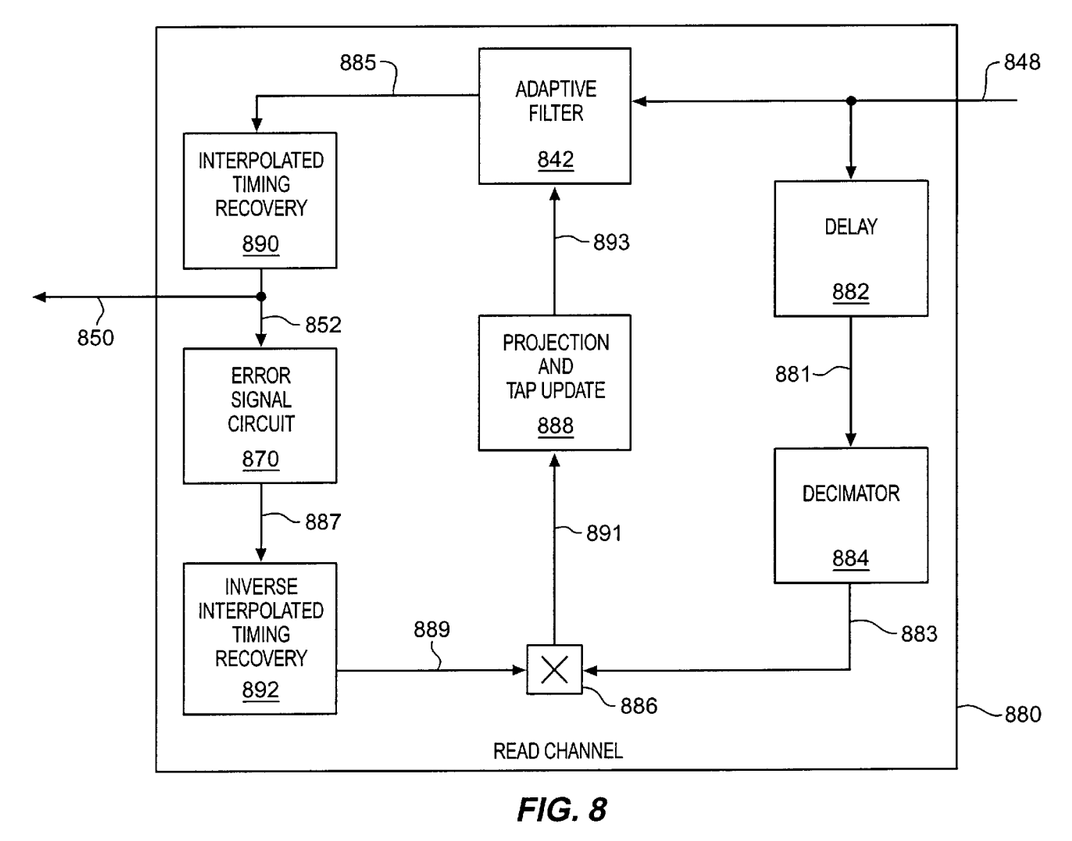
FIG. 8 is a block diagram that depicts alternative read channel circuitry in an example of the invention.
Figure 9:
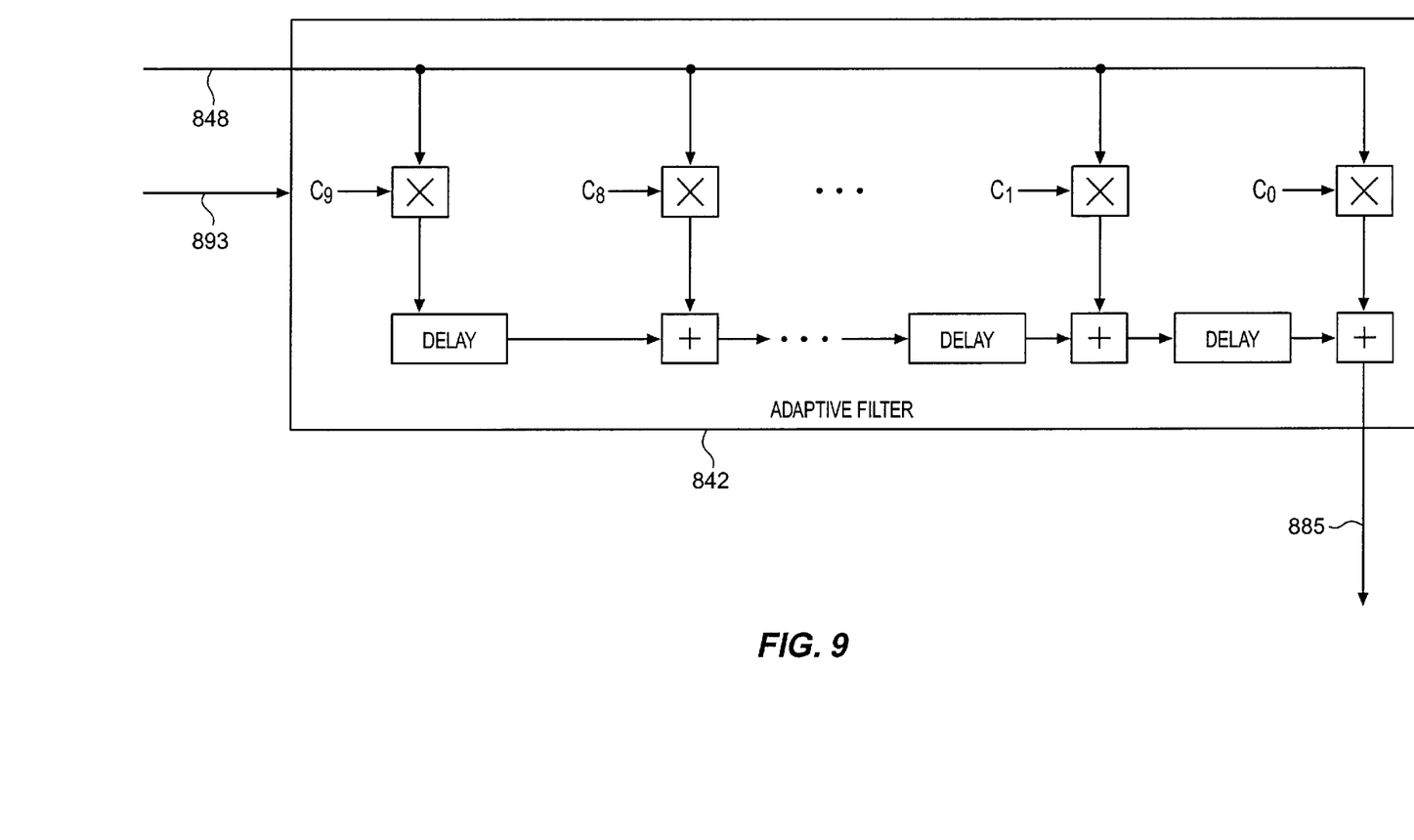
FIG. 9 is a block diagram that depicts adaptive filter circuitry in an example of the invention.
Figure 10:
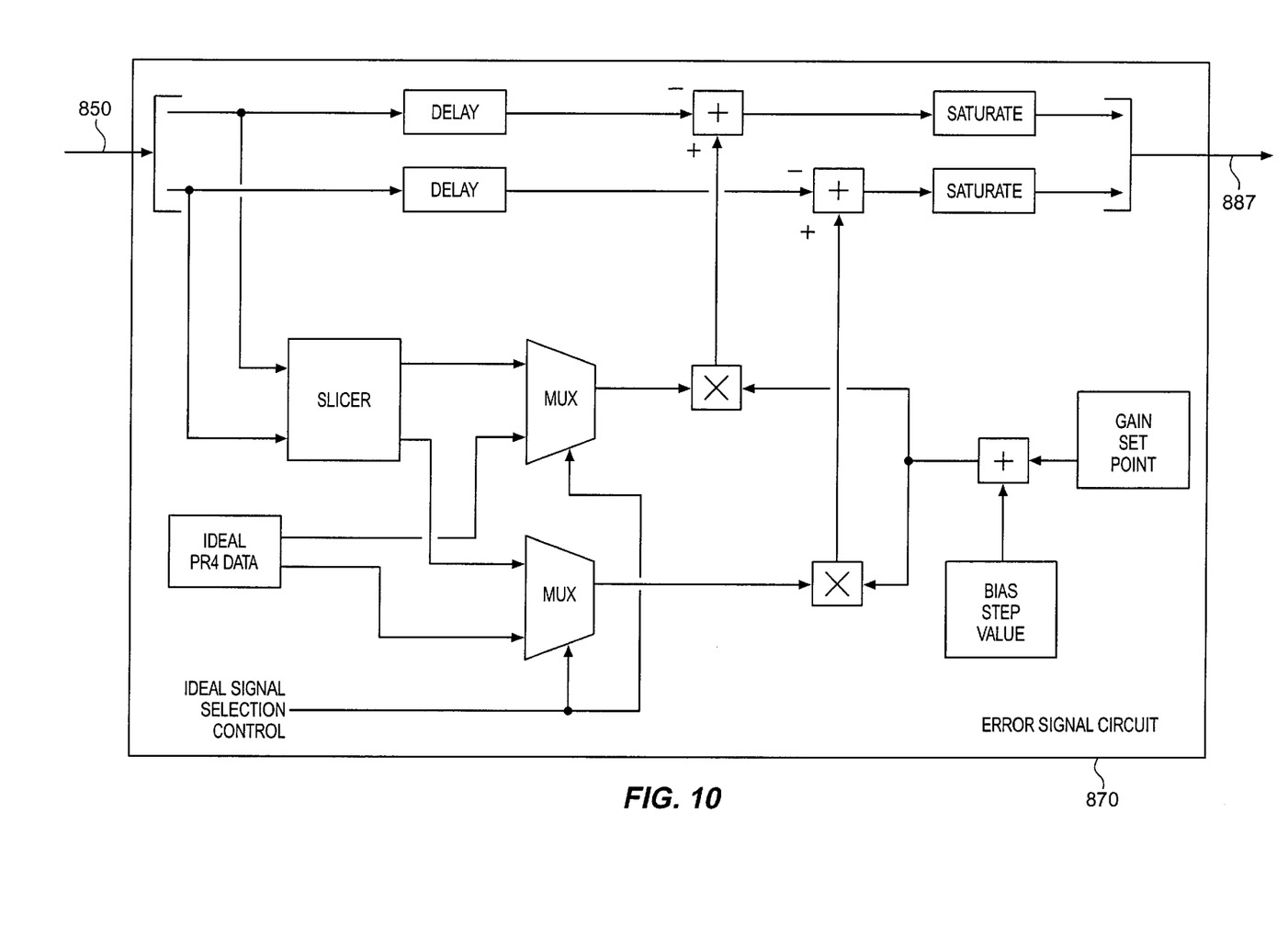
FIG. 10 is a block diagram that depicts error signal circuitry in an example of the invention.

Alternative Read Channel—FIGS. 8–10

FIGS. 8–10 depict a specific example of an alternative version 880 of the read channel circuitry in accord with the present invention. Those skilled in the art will appreciate numerous variations from this example that do not depart from the scope of the invention. Those skilled in the art will also appreciate that various features described below could be combined with the above-described embodiment to form multiple variations of the invention.

The read channel 880 is comprised of delay 882, decimator 884, multiplier 886, projection and tap update 888, adaptive filter 842, interpolated timing recovery 890, error signal circuit 870, and inverse interpolated timing recovery 892. The sampled signal 848 is received into the adaptive filter 842 and the delay 882. The delay 882 introduces a delay to subsequently match the two signals 883, 889 received into the multiplier 886. The delay 882 provides a delayed version 881 of the sampled signal 848 to the decimator 884. The decimator 884 decimates the delayed signal 881 by a factor of ten and provides the decimated-delayed signal 883 to the multiplier 886.

The adaptive filter 842 receives and equalizes the sampled signal 848 using variable coefficients to generate a shaped signal 885. The adaptive filter 842 provides the shaped signal 885 to the interpolated timing recovery 890. The interpolated timing recovery 890 generates timed-shaped signal 850 by adding an estimated sample at a detection time point using the pulse samples in the shaped signal 885. The interpolated timing recovery 890 provides the timed-shaped 850 signal to decoder circuitry (not shown) and the copy 852 to the error signal circuit 870. The error signal circuit 870 generates a biased error signal 887 from the timed-shaped copy signal 852 and provides the biased error signal 887 to the inverse interpolated timing recovery 892. The inverse interpolated timing recovery 892 re-adjusts the timing of the biased error signal 887 back to the clock rate of the adaptive filter 842 to counter the timing effects of the interpolated timing recovery 890.

The multiplier 886 receives and multiplies the time-adjusted and biased error signal 889 and the decimated-delayed signal 883. The multiplier 886 provides its product, error signal 891, to the projection and tap update 888. The projection and tap update 888 uses an LMS algorithm to process the error signal 891 and provide updated coefficients 893 to the adaptive filter 842. The projection and tap update 888 constrains the LMS algorithm by fixing the filter response at a frequency equal to the sample frequency divided by four ($f_s/4$). In other words, the frequency response of the adaptive filter 842 at $f_s/4$ is fixed to a set value. The following United States patent applications discuss the read channel circuitry in greater detail and are hereby incorporated by reference: U.S. Pat. No. 5,760,984 entitled "COST REDUCED INTERPOLATED TIMING RECOVERY IN A SAMPLED AMPLITUDE READ CHANNEL"; U.S. Pat. No. 5,563,819 entitled "FAST HIGH PRECISION DISCRETE-TIME ANALOG FINITE IMPULSE RESPONSE FILTER"; U.S. Pat. No. 5,696,639 entitled "SAMPLED AMPLITUDE READ CHANNEL EMPLOYING INTERPOLATED TIMING RECOVERY"; U.S. Pat. No. 5,717,619 entitled "COST REDUCED TIME VARYING FIR FILTER"; and U.S. Pat. No. 5,726,818 entitled "MAGNETIC DISK SAMPLED AMPLITUDE READ CHANNEL EMPLOYING INTERPOLATED TIMING RECOVERY FOR SYNCHRONOUS DETECTION OF TIMING EMBEDDED DATA"; all of which are assigned to Cirrus Logic of Fremont, Calif.

FIG. 9 depicts the adaptive filter 842. The adaptive filter 842 receives the all sampled signal 848 and forms the pulses in the sampled signal 848 into a shape expected by a decoder. The adaptive filter 842 is a digital FIR Type II adaptive filter with ten taps that uses PR4 for an equalization target. The ten taps are alternatively updated five at a time by the coefficients 893. In operation, the sampled signal 848 is provided to a series of multipliers where it is multiplied by the coefficients $c_0$–$c_9$. The products from the multipliers are delayed and summed to generate the shaped signal 885.

FIG. 10 depicts the error signal circuit 870. It can be seen on FIG. 10 that error signal circuit 870 interleaves inputs, processing, and outputs as is known in the art. A slicer receives the input signals from the signal 852. Based on a control signal, the muxes select an ideal signal from either the slicer output or stored ideal PR4 data. An adder sums a bias step value and a gain set point. Multipliers generate a biased ideal signal by multiplying this sum with the selected ideal signal from the muxes. Adders then generate a biased error signal by subtracting a delayed version of the input signals from biased ideal signal. Saturation elements process and output the biased error signal 887.

Figure 11:
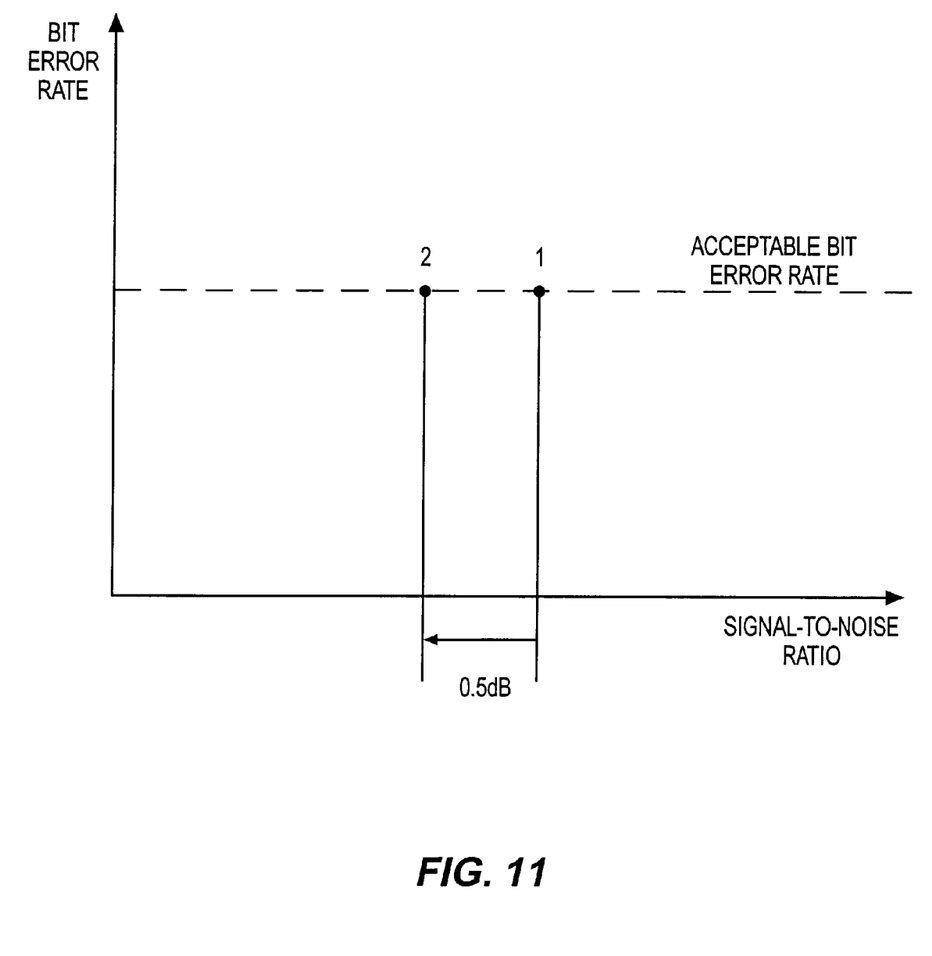
FIG. 11 is a graph that depicts the performance of a conventional disk drive system versus the performance a disk drive system that operates in accord with the invention.

Performance Comparison—FIG. 11

FIG. 11 depicts the performance benefit achieved by using the biasing of the present invention. The vertical axis represents the bit error rate of the read channel, and the horizontal axis represents the signal-to-noise ratio. An acceptable bit error rate is marked by the dashed line. The point 1 represents the signal-to-noise ratio required to attain an acceptable bit error rate in a conventional read channel. The point 2 represents the signal-to-noise ratio required to attain an acceptable bit error rate in a read channel using the present invention. The signal-to noise ratio may be decreased by 0.5 dB while maintaining an acceptable bit error rate when the invention is used. The 0.5 dB value represents an exponential decrease in the required signal-to-noise ratio. With the invention, more noise can be tolerated or less signal power can be used. This means that either disk drive error performance is improved or disk drive components can be less expensive than before while maintaining the same performance.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. Disk drive control circuitry comprising:
   adaptive filter circuitry operational to shape samples of an analog signal representing data stored a disk device based on a plurality of coefficients to produce a shaped signal equalized for decoding into a digital signal representing the data stored on the disk device; and
   error signal circuitry operational to generate a biased error signal to adjust the coefficients.

2. The disk drive control circuitry of claim 1 wherein the error signal circuitry is operational to generate the biased error signal by determining a difference between an ideal signal and the shaped signal.

3. The disk drive control circuitry of claim 2 wherein the error signal circuitry is operational to generate the biased error signal by biasing the ideal signal.

4. The disk drive control circuitry of claim 3 wherein the error signal circuitry is operational to bias the ideal signal by adjusting a slicer output by a step value.

5. The disk drive control circuitry of claim 1 wherein the error signal circuitry is operational to generate the biased error signal by biasing the shaped signal.

6. The disk drive control circuitry of claim 1 further comprising servo circuitry.

7. The disk drive control circuitry of claim 1 further comprising a disk drive controller.

8. The disk drive control circuitry of claim 1 wherein the disk drive control circuitry is in read channel circuitry.

9. The disk drive control circuitry of claim 8 further comprising an analog-to-digital converter.

10. The disk drive control circuitry of claim 8 further comprising a decoder.

11. Disk drive control circuitry comprising:
    bias circuitry operational to generate a biased ideal signal; and
    error signal circuitry operational to generate a biased error signal for a read channel adaptive filter by determining a difference between the biased ideal signal and an output signal from the read channel adaptive filter.

12. The disk drive control circuitry of claim 11 wherein the bias circuitry is operational to bias the ideal signal by adjusting a slicer output by a step value.

13. The disk drive control circuitry of claim 11 further comprising the adaptive filter.

14. The disk drive control circuitry of claim 11 further comprising servo circuitry.

15. The disk drive control circuitry of claim 11 further comprising a disk drive controller.

16. The disk drive control circuitry of claim 11 wherein the disk drive circuitry is in a read channel circuit.

17. The disk drive control circuitry of claim 16 further comprising an analog-to-digital converter.

18. The disk drive control circuitry of claim 16 further comprising a decoder.

19. A disk drive system comprising:
    a disk device operational to store data and transfer an analog signal representing the data; and
    control circuitry operational to receive the analog signal, convert the analog signal into a digital signal, transfer the digital signal, and bias an error signal used to adjust coefficients for an adaptive filter, wherein the control circuitry comprises a disk drive controller operational to manage data transfers, read channel circuitry operational to convert the analog signal into the digital signal, and servo circuitry operational to control positioning of the disk device, and wherein the read channel circuitry further comprises:
    an analog-to-digital converter operational to receive and sample the analog signal to generate a sampled signal;
    the adaptive filter is operational to shape the sampled signal based the coefficients to produce a shaped signal;
    a decoder operational to process the shaped signal to generate the digital signal; and
    error signal circuitry operational to bias the error signal.

20. The disk drive system of claim 19 wherein the disk device comprises:
    disks operational to store the data;
    heads operational to read the data from the disks to generate the analog signal; and
    motors operational to position the heads and the disks.

21. The disk drive system of claim 20 wherein the disks are magnetic disks.

22. The disk drive system of claim 20 wherein the disks are optical disks.

23. The disk drive system of claim 19 wherein the error signal circuitry is operational to bias the error signal by determining a difference between an ideal signal and the shaped signal.

24. The disk drive system of claim 23 wherein the error signal circuitry is operational to bias the error signal by biasing the ideal signal.

25. The disk drive system of claim 24 wherein the error signal circuitry is operational to bias the ideal signal by adjusting a slicer output by a step value.

26. The disk drive system of claim 19 wherein the error signal circuitry is operational to bias the error signal by biasing the shaped signal.

27. A method for operating disk drive control circuitry, the method comprising:

shaping samples of an analog signal representing data stored a disk device in an adaptive filter based on a plurality of coefficients to produce a shaped signal equalized for decoding into a digital signal representing the data stored on the disk device; and generating a biased error signal to adjust the coefficients.

28. The method of claim 27 wherein generating the biased error signal comprises determining a difference between an ideal signal and the shaped signal.

29. The method of claim 28 wherein generating the biased error signal comprises biasing the ideal signal.

30. The method of claim 29 wherein biasing the ideal signal comprises adjusting a slicer output by a step value.

31. The method of claim 27 wherein generating the biased error signal comprises biasing the shaped signal.

32. The method of claim 27 further comprising sampling an analog signal from the disk device to generate the input signal.

33. The method of claim 27 further comprising decoding the shaped signal to generate a digital signal that represents the data.

34. A method for operating disk drive control circuitry, the method comprising:

generating a biased ideal signal; and determining a difference between the biased ideal signal and an output signal from a read channel adaptive filter to generate a biased error signal to adjust coefficients in the read channel adaptive filter.

35. The method of claim 34 wherein generating the biased ideal signal comprises adjusting a slicer output by a step value.

36. The method of claim 34 further comprising processing an input signal in the adaptive filter to generate the output signal.

37. The method of claim 36 further comprising sampling an analog signal from a disk device to generate the input signal.

38. The method of claim 34 further comprising decoding the output signal to generate a digital signal that represents the data.

39. A method for operating a disk drive system comprising:

transferring an analog signal representing data stored on a disk device;

receiving the analog signal;

sampling the analog signal to generate a sampled signal;

shaping the sampled signal in the adaptive filter based on the coefficients to produce a shaped signal;

decoding the shaped signal to generate a digital signal. transferring the digital signal; and biasing an error signal used to adjust coefficients in an adaptive filter.

40. The method of claim 39 further comprising:

positioning heads and disks in the disk device; and reading the data from the disks to generate the analog signal.

41. The method of claim 40 wherein the disks are magnetic disks.

42. The method of claim 40 wherein the disks are optical disks.

43. The method of claim 39 wherein biasing the error signal comprises determining a difference between an ideal signal and the shaped signal.

44. The method of claim 43 wherein biasing the error signal comprises biasing the ideal signal.

45. The method of claim 44 wherein biasing the ideal signal comprises adjusting a slicer output by a step value.

46. The method of claim 39 wherein biasing the error signal comprises biasing the shaped signal.

* * * * *